United States Patent [19]
Zhu et al.

[11] Patent Number: 5,935,068
[45] Date of Patent: Aug. 10, 1999

[54] SYSTEM AND METHOD FOR IMPROVING ULTRASOUND IMAGE CONTRAST BY AMPLITUDE COMPRESSION OF ULTRASONIC WAVEFRONT SIGNALS

[75] Inventors: Qing Zhu, Jenkintown; Bernard D. Steinberg, Philadelphia, both of Pa.

[73] Assignee: The Trustees of the University of Pennsylvania, Philadelphia, Pa.

[21] Appl. No.: 08/881,316

[22] Filed: Jun. 25, 1997

Related U.S. Application Data

[60] Provisional application No. 60/030,179, Nov. 1, 1996.

[51] Int. Cl.[6] .................................................. A61B 8/00
[52] U.S. Cl. ........................ 600/443; 600/458; 600/447
[58] Field of Search .................................. 600/443, 447, 600/453, 458

[56] References Cited

U.S. PATENT DOCUMENTS

| | | | |
|---|---|---|---|
| 5,172,343 | 12/1992 | O'Donnell | 600/447 |
| 5,383,457 | 1/1995 | Cihen | 600/443 |
| 5,423,318 | 6/1995 | Li et al. | 600/447 |
| 5,570,691 | 11/1996 | Wright et al. | 600/447 |

OTHER PUBLICATIONS

Flax, et al., "Phase–Aberration Correction Using Signals From Point Reflectors and Diffuse Scatterers: Basic Principles," IEEE Transactions on Ultrasonics, Ferroelectrics, and Frequency Control, vol. 35, No. 6, Nov. 1988, pp. 758–767.

Nock, et al., "Phase aberration correction in medical ultrasound using speckle brightness as a quality factor," J. Acoust. Soc. Am., 85 (5), May 1989, pp. 1819–1833.

Bernard D. Steinberg, "Radar Imaging from Distorted Array: The Radio Camera Algorithm and Experiments," IEEE Transactions on Antennas and Propagation, vol. AP–29, No. 5, Sep. 1981, pp. 740–748.

Mathias Fink, "Time Reversal of Ultrasonic Fields–Part I: Basic Principles," IEEE Transactons on Ultrasonics, Ferroelectrics, and Frequency Control, vol. 39, No. 5, Sep. 1992, pp. 555–566.

Liu et al., "Correction of ultrasonic wavefront distortion using backpropagation and a reference waveform method for time–shift compensation," J. Acoust. Soc. Am., 96 (2), Pt. 1, Aug. 1994, pp. 649–660.

Carpenter, et al., "Correction of Distortion in US Images Caused by Subcutaneous Tissues: Results in Tissue Phantoms and Human Subjects[1]," Radiology, vol. 195, No. 2, May 1995, pp. 563–567.

Hinkelman, et al., "Measurement and correction of ultrasonic pulse distortion produced by the human breast," J. Acoust. Soc. Am, 97 (3), Mar. 1995, pp. 1958–1969.

Attia, et al., "Self–Cohering Large Antenna Arrays Using the Spatial Correlation Properties of Radar Clutter," IEEE Transactions on Antennas and Propagation, vol. 37, No. 1, Jan. 1989, pp. 30–38.

(List continued on next page.)

*Primary Examiner*—Marvin M. Lateef
*Assistant Examiner*—Maulin Patel
*Attorney, Agent, or Firm*—Woodcock Washburn Kurtz Mackiewicz & Norris LLP

[57] ABSTRACT

A wavefront compensation technique which approaches the performance of Inverse Filtering while demonstrating adequate stability and signal to noise ratio. The spectrum amplitude is compressed in combination with phase deaberration algorithms by compressing the amplitude distortion using an amplitude compression function, such as an Mth root function, which converges the amplitudes towards the ideal inverse filtering solution in conjunction with conventional phase deaberration algorithms. Wavefront compensation using the compressed amplitude distortion data in accordance with the invention provides substantial contrast improvement over conventional phase only deaberration algorithms. In experiments, the mainlobe diffraction shape has been restored down to a -30 dB level necessary for resolving small breast lesions.

13 Claims, 10 Drawing Sheets

OTHER PUBLICATIONS

Yue Li, "Phase Aberration Correction Using Near–Field Signal Redundancy–Part I: Principles" IEEE Transactions on Ultrasonics, Ferroelectrics, and Frequency Control, vol. 44, No. 2, Mar. 1997, pp. 355–371.

Dorme, et al., "Focusing in transmit–receive mode through inhomogeneous media: The time reversal matched filter approach," J. Acoust. Soc. Am., 98 (2), Pt. 1, Aug. 1995, pp. 1155–1162.

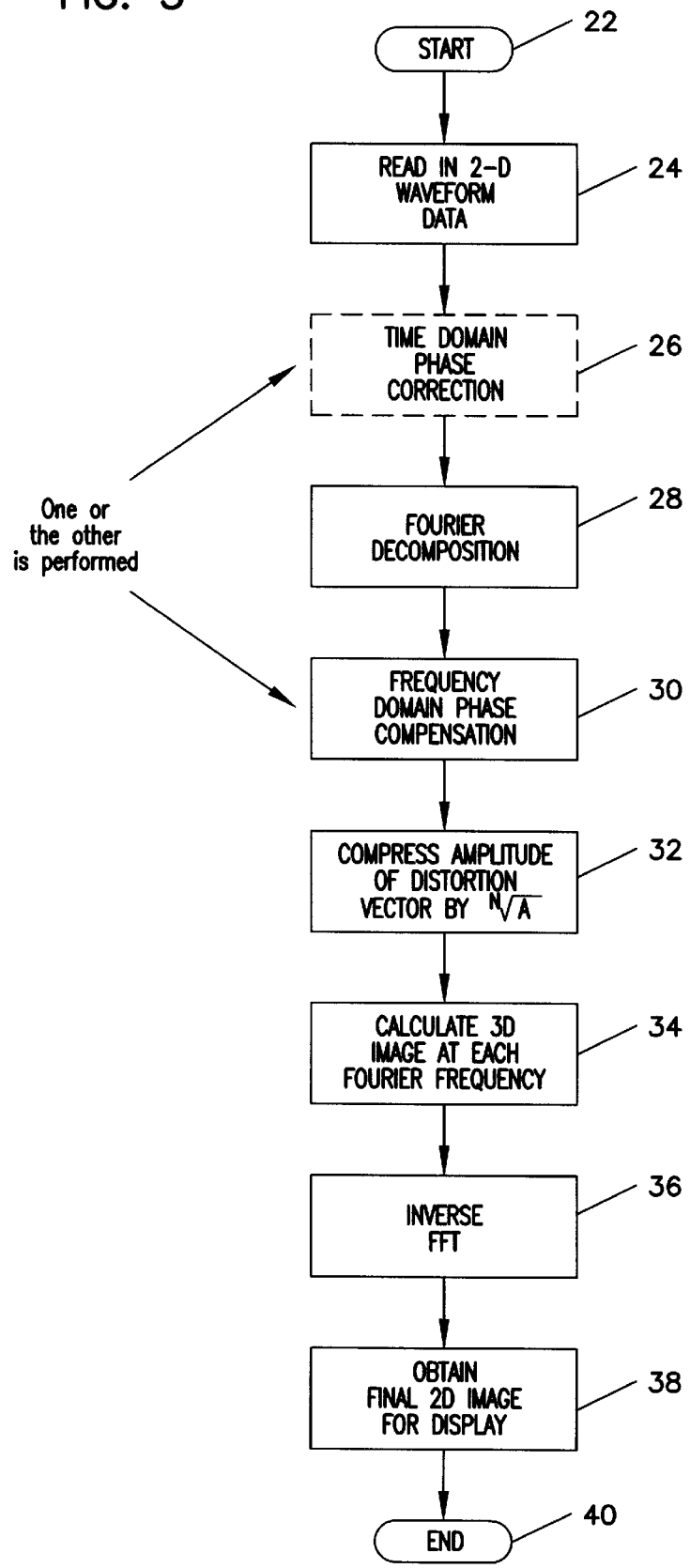

SYSTEM AND METHOD FOR IMPROVING
ULTRASOUND IMAGE CONTRAST BY
AMPLITUDE COMPRESSION OF
ULTRASONIC WAVEFRONT SIGNALS

CROSS REFERENCE TO RELATED APPLICATIONS

This application is a utility application corresponding to U.S. Provisional Application Ser. No. 60/030,179, filed Nov. 1, 1996, the contents of which are herein incorporated by reference.

BACKGROUND OF THE INVENTION

1. Field of the Invention

The present invention relates to a system and method for improving the contrast in ultrasound images. In particular, the present invention relates to a technique for significantly improving contrast resolution in ultrasound images by compressing the spectrum amplitude while maintaining adequate signal to noise ratio.

2. Description of the Prior Art

Ultrasonic wavefront distortion which includes phase aberration and waveform distortion develops as coherent ultrasonic waves propagate through an inhomogeneous medium, such as the breast. Wavefront distortion sources inside the breast can be modeled as incoherent scattering and coherent multipath interference. Scattering reduces the target strength, broadens the image lobe, raises the background level, and therefore lowers the image contrast. Multipath interference produces ghost image artifacts or false targets in addition to true targets in the image. As known by those skilled in the ultrasound art, the interference problem is more severe when the aperture is large for high spatial resolution because the transducers cover large volumes of inhomogeneous tissue and the ultrasonic beams interact with more spatial variations in tissue composition.

FIG. 1 illustrates the effects of incoherent scattering and multipath interference upon a point source image or its angular spectrum (intensity distribution), where FIG. 1(a) illustrates scattering induced distortion in the angular source intensity distribution and FIG. 1(b) illustrates refraction and scattering induced distortion in the angular source intensity distribution. Without medium induced distortion, a diffraction limited coherent spectrum is produced. However, with the presence of medium induced scattering, the overall angular spectrum is the sum of coherent and scattered spectra, as shown in FIG. 1(a). Because of scattering the spectrum is broadened and reduced in strength. The background level is increased and, therefore, image contrast is reduced. In general, the scattered energy increases with the propagation depth. On the other hand, with the presence of both medium induced scattering and coherent multipath interference, the angular spectrum is the superposition of the coherent lobe, coherent interference lobes and the scattering spectrum, as shown in FIG. 1(b). In FIG. 1(b), the interference lobes, produced by bending and splitting of coherent waves as well as interference of coherent waves with multipath waves caused by refraction and reflection, appear as false targets.

Generally, the refraction and scattering induced wavefront distortion consists of phase and waveform distortions. Most conventional algorithms compensate the phase distortion but do not address the waveform distortion. For example, two basic phase deaberration algorithms have been proposed by Flax et al. in an article entitled "Phase Aberration Correction Using Signals From Point Reflectors and Diffuse Scatterers: Basic Principles," *IEEE Trans. Ultrason. Ferroelec. Freq. Cont.*, Vol. 35, No. 6, pages 758–767 (November 1988) and by Nock et al. in an article entitled "Phase Aberration Correction in Medical Ultrasound Using Speckle Brightness as a Quality Factor," *J. Acoust. Soc. Am.*, Vol. 85, No. 5, pages 1819–1833 (1989). These algorithms adjust time delays of received waveforms at different elements of a phased array to compensate delay errors due to an inhomogeneous medium and consequently reduce the scattered energy. Although these two algorithms have been derived from different optimization criteria, their performances are similar; they minimize time delay errors or phase errors but leave waveform distortion intact.

Generally, when certain correlation properties exist in the wavefront, such phase deaberration algorithms are useful to partially remove phase distortion and build up the strength of the coherent field. However, waveform distortion remains, as does residual phase distortion, and produces a significantly high background level in the spectrum. As a result, such basic deaberration algorithms are suitable only for weak scattering that can be modeled as a thin random phase screen located in the plane of the receiving aperture.

FIG. 2 schematically shows the effects of phase deaberration, where FIGS. 2(a) and 2(b) respectively illustrate the angular source intensity distributions of FIGS. 1(a) and 1(b) after phase compensation.

Several other techniques are known in the art for compensating phase distortion. With reference to FIG. 3, several such distortion correction methods will now be compared in connection with the correction of a complex spectrum amplitude of a point source image measured in array f=Aexp(j$\phi$). Those skilled in the art will appreciate that most of these techniques, as well as the technique of the invention, are not limited to point source targets and are applicable to diffuse scattering mediums such as the breast.

Consider complex signal vectors $S_0(x)=A_0\exp(j\Psi_0)$ and $S(x)==A\exp(j\Psi)$ received at an ultrasound array in the absence and presence of distortion, respectively. $S_0$ and S are functions of position in the array which is identified by element number. The multiplicative distortion vector f=S/$S_0$=aexp(j$\phi$) is the ratio of S to $S_0$, where a=A/$A_0$. FIG. 3 compares deaberration transformations for a complex sample f, which is the distortion vector for an instantaneous sample of the radiation field. Transformations to the real axis X all correct phase. Those transformations to the left on the real axis X maximize signal-to-noise ratio but increase amplitude distortion, while those transformations to the right maximize imaging fidelity but increase noise. Thus, the optimum compensation weight vector or transformation is the right-most one (Inverse Filtering (IF) w=$a^{-1}\exp(-j\phi)$) which carries the distortion component of the complex sample to the intersection of the X axis and the unit circle, for then both amplitude and phase are exactly corrected. On the other hand, as illustrated in FIG. 3, the left-most transformation is matched filtering (MF) (w=aexp(-j$\phi$), which squares the amplitude and conjugates the phase.

MF is theoretically optimum for maximizing signal-to-noise ratio on a white, Gaussian channel. MF is an optimum solution for detection (radar) but not so when fidelity is an important criterion, as in medical imaging. However, MF does satisfy the requirement for phase correction. Examples of MF algorithms are the Dominant Scatterer Algorithm (DSA) described by Steinberg in an article entitled "Radar Imaging From a Distorted Array: The Radio Camera Algorithm and Experiments," *IEEE Trans. Antennas Propag.*, Vol. AP-29, No. 5, pages 740–748 (September 1981), and the Time Reversal Mirror (TRM) described by Fink in an article entitled "Time Reversal of Ultrasonic Fields—Part I: Basic Principles," *IEEE Trans. Ultrason. Ferroelec. Freq. Contr.*, Vol. 39, pages 555–566 (1992). MF algorithms are useful when wavefront distortion resides principally in phase, with amplitude relatively unaffected. Otherwise, MF algorithms would be less effective than if amplitude were ignored and phase only were corrected, for by squaring the wavefront amplitude, the MF algorithms increase amplitude variance which contributes to the increase of energy in the sidelobe region. This is problematic when substantial wavefront distortion is present.

Now consider what happens when a phantom consisting of a random phase screen is placed at a receiving transducer. The element signal samples are correct in amplitude and distorted only in phase by a random additive component. Phase aberration correction, consisting of phase conjugation (PC), is then the optimum compensation. The signal amplitude is unchanged and phase error is completely compensated by conjugation. As shown in FIG. 3, PC is represented by the second transformation from the left. Time delay compensation (TDC) is in the same class of transformations.

IF is theoretically ideal for fidelity but has drawbacks. In particular, because the IF adjusts the channel gain to be the reciprocal of the signal strength, at points in the receiving aperture where signal strength is weak the enhanced channel gain raises the noise to the point where signal-to-noise ratio can be impaired. This is particularly troublesome when there is coherent refractive interference in the receiving array. A second potential problem is that an IF is unstable when the distorting medium has zeroes in the complex plane. Thus, the right-most transformation carries the wavefront correction too far. The compensation of wavefront distortion, on the other hand, presents a more difficult problem because there is no general way to reduce wavefront amplitude distortion.

Liu et al. disclose in an article entitled "Correction of Ultrasonic Wavefront Distortion Using Backpropagation and Reference Waveform Method for Time-Shift Compensation," *J. Acoust. Soc. Am.*, Vol. 96, pages 649–660 (1994), a backpropagation technique (BPT) for improving the time-delay type compensation algorithm by backpropagating the received waveforms to an optimal distance and then performing time-delay compensation at this distance. The backpropagation provides first order correction of wavefront amplitude distortion due to propagation from the backpropagation distance to the receiving aperture and, therefore, performs better than phase deabberation at the aperture. BPT does not employ any amplitude weighting, and the BPT transformation is somewhere to the right of TDC and PC in FIG. 3.

On the other hand, Carpenter et al. describe in an article entitled "Correction of Distortion in US Images Caused By Subcutaneous Tissues: Results in Tissue Phantoms and Human Subjects," *Radiology*, Vol. 195, pages 563–567 (1995) a model-based approach that uses a priori information of the speeds of the rectus muscle layers inside the abdominal wall has been developed to correct double image artifacts caused by refraction when imaging the abdomen. However, such a technique is not practical for general clinical settings since the model-based approach requires prior information about the source of the distortion. A wavefront distortion correction technique is desired that does not require such prior information about the source of the distortion.

The complex amplitude weights of MF, PC, and IF are, respectively, a, 1, and $a^{-1}$, each multiplied by $(\exp(-j\phi))$.

The signal after weighting is $a^2$, a, and 1, respectively. The first and last weights are far from optimum for the reasons noted above. An intermediate transformation is desired which is a compromise between these weightings and which does not require prior information about the source of the distortion. Ideally, the signal after weighting has an amplitude approaching 1 and approaches the amplitude and phase correction results of IF yet does not decrease the signal to noise ratio and cause the transformation to become unstable as in the IF transformation. The present invention has been designed for this purpose by combining a spectrum amplitude compression operation with phase deaberration.

SUMMARY OF THE INVENTION

A method and apparatus which corrects incoherent wavefront distortion in accordance with the invention weights the amplitude A of the wavefront signal such that the signal after weighting has compressed amplitude but is also stable and has a comparable signal to noise ratio. In a currently preferred embodiment, the correction vector is $A^{-1/N}\exp(-j\phi)$, where N is an integer greater than or equal to 2. The signal after weighting is $A^{1/N}$. Substantial improvement in image contrast with comparable signal to noise ratio has been shown for N=2, and even better contrast has been shown for N=4. In general, the correction vector is $A^{-(N-1)/N}\exp(-j\phi)$ and the signal amplitude is $A^{1/N}$ after transformation of the Nth root. The Nth root operation upon wavefront amplitude is a nonlinear compression transformation which can, for low order values for N, in addition to phase deaberration at the aperture, or to BPT, significantly improve contrast resolution by recovering the mainlobe down to −30 dB without impairing the signal to noise ratio and encountering the stability problem in the IR transformation.

Of course, other nonlinear compression transformations besides the Nth root operation described herein may be used to compress the wavefront amplitude. Generally, it is preferred that such compression transformations have functions in which the output converges towards the inverse filtering solution. The degree of compression is then selected to maximize signal to noise ratio.

BRIEF DESCRIPTION OF THE DRAWINGS

The above-mentioned objects and advantages of the invention will become more apparent and more readily appreciated from the following detailed description of presently preferred exemplary embodiments of the invention taken in conjunction with the accompanying drawings, of which:

FIG. 5 illustrates the processing performed by aberration correction software in accordance with a preferred embodiment of the invention.

DETAILED DESCRIPTION OF PRESENTLY PREFERRED EMBODIMENTS

A wavefront aberration correction technique with the above-mentioned beneficial features in accordance with a presently preferred exemplary embodiment of the invention will be described below with reference to FIGS. 4–11. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Figure 1A:
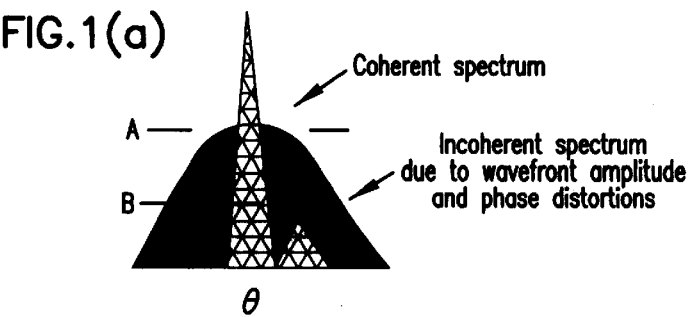
FIGS. 1(a) and 1(b) respectively illustrate angular source intensity distributions for scattering induced distortion and refraction and scattering induced distortion.
Figure 1B:
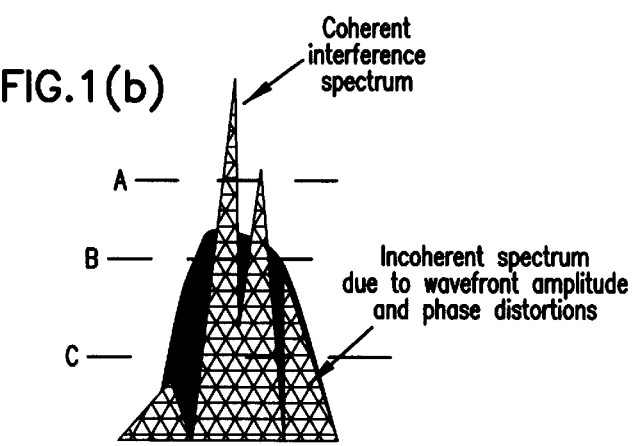
Figure 2A:
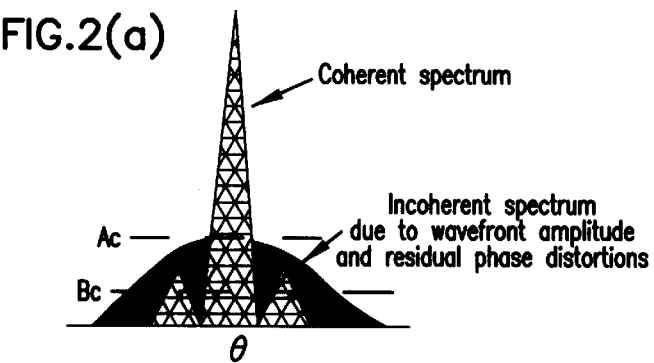
FIGS. 2(a) and 2(b) respectively illustrate the angular source intensity distributions of FIGS. 1(a) and 1(b) after phase compensation.
Figure 2B:
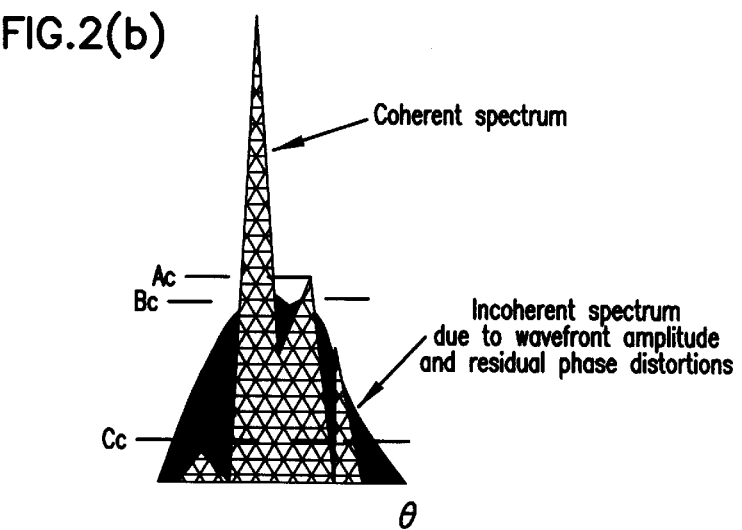
Figure 3:
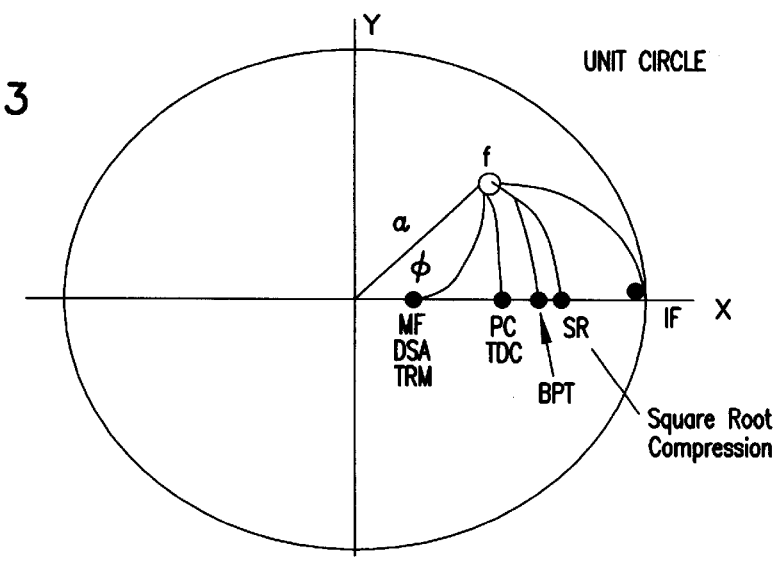
FIG. 3 illustrates the relationship among deaberration transformations for correcting phase and amplitude distortions introduced by the ultrasound propagation medium.
Figure 4:
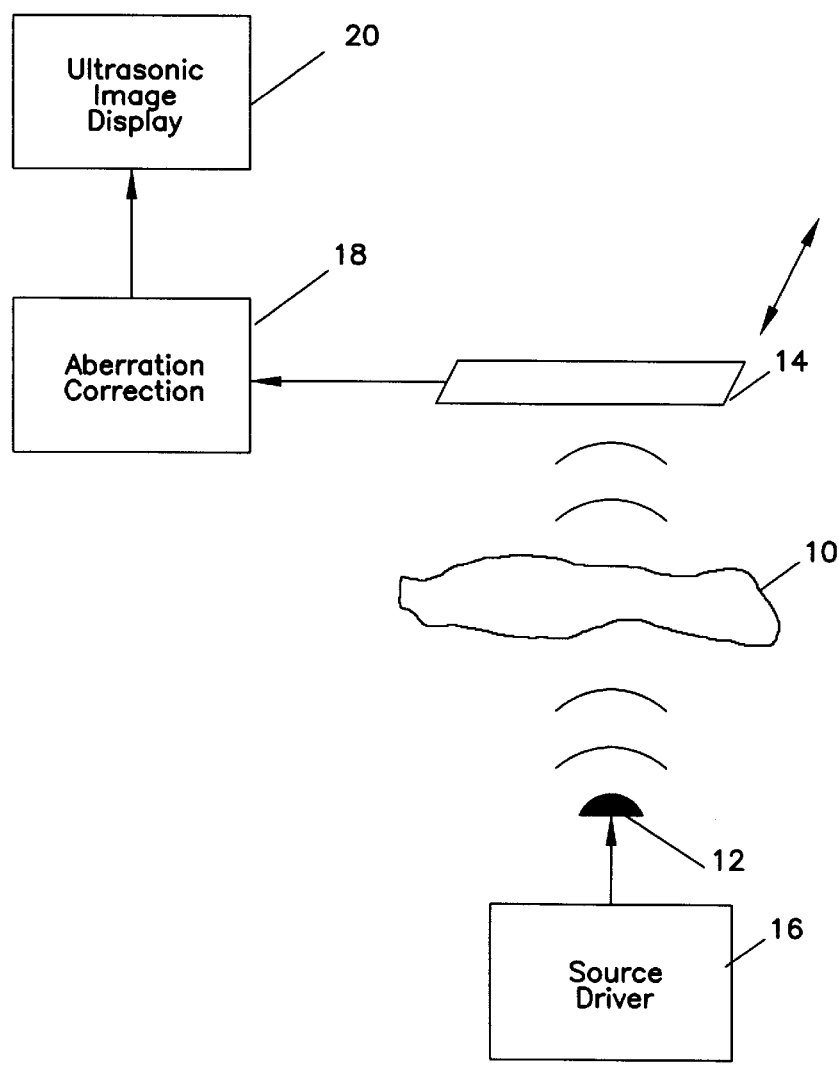
FIG. 4 illustrates a 2-D ultrasonic measurement system in accordance with the invention.

FIG. 4 illustrates a 2-D measurement system in accordance with the invention. A more detailed description of such a 2-D measurement system and associated procedure is described by Hinkelman et al. in an article entitled "Measurement and Correction of Ultrasonic Pulse Distortion Produced By the Human Breast," *J. Acoust. Soc. Am.*, Vol. 97, No. 3, pages 1958–1969 (1995). As shown in FIG. 4, a breast tissue specimen 10 is placed between a hemispherical source 12 which emulates a virtual point source and an ultrasonic receiving array 14 with the skin facing the direction of the receiving array 14. In an experimental configuration, a synthetic 2-D aperture is formed by translating a 92-mm 1-D linear array 14 for a distance of 46 mm perpendicular to its axis to form a synthetic 92 mm×46 mm 2-D array. Element pitch in the receiving transducer was 0.72 mm and a reflecting mask reduced the receiving elevation to 1.44 mm. The transmission frequency from source driver 16 was 3.7 MHZ one-way, and the bandwidth was 2 MHZ. 2-D wavefronts were measured at each element in the receiving array 14, from which one-way point spread functions were reconstructed as functions of time and compensated using the techniques of the invention by aberration correction circuitry 18 prior to display on an ultrasonic image display 20. In a preferred embodiment, aberration correction circuitry 18 is implemented in software on a general purpose computer (not shown), although aberration correction circuitry 18 could also be implemented in firmware and/or hardware as desired.

FIG. 5 illustrates the processing performed by aberration correction software in accordance with the preferred embodiment of the invention. As shown, the processing starts at step 22 by reading in the 2-D waveform data from the ultrasonic transducer array 14 at step 24. Then, if time domain phase correction processing is to be used, phase correction of the waveform data is performed at step 26. For example, the phase may be compensated using conventional TDC techniques, where the pulse arrival time fluctuation across the transducer array is calculated from cross-correlation peak values of the correlation function between the received pulses and a reference pulse or between neighbor pulses. The 2-D waveforms are then decomposed into spatial frequency components for each element across the ultrasonic scan at step 28 by taking the FFT of the temporal waveforms at each (x,y) position in the aperture or by using some other known integral transformation function such as the wavelet transform. Then, if a frequency domain phase compensation technique is to be used, the phase correction of the waveform data is performed at step 30. For example, the phase may be compensated using frequency domain TDC techniques such as the one proposed by Attia and Steinberg in an article entitled "Self-Cohering Large Antenna Arrays Using the Spatial Correlation Properties of Radar Clutter," IEEE Trans. Antennas Prop., AP-37(1), pp. 30–38 (1989). Of course, the time and frequency domain phase corrections may both be used, or only one or the other may be used. Similarly, the phase correction may be performed during the integral transformation in step 28.

Next, in accordance with the techniques of the invention, the amplitude A of the wavefront distortion vectors are compressed at step 32 by taking the Nth root of the amplitude A. On the other hand, in accordance with the invention, another amplitude compression function of $A(\phi)$ having an output which converges towards the inverse filtering solution may be implemented at step 32 in place of the Nth root function. At step 34, complex CW 2-D images are calculated at each discrete Fourier frequency in the focal plane using the angular spectrum technique, and the 2-D images are summed to form a 3-D transient image by taking the inverse Fourier transform at step 36. The final 2-D image is then obtained at step 38, and the imaging process is exited at step 40.

EXPERIMENTAL RESULTS

An experiment using a configuration of the type shown in FIGS. 4 and 5 will now be described. In the experiment, additional processing steps were taken. In particular, before the Fourier decomposition at step 28, the received pulse at each element of ultrasonic array 14 was temporally weighted by a 10-point cosine taper over the trailing 10 points of a 40-point time window that contained the main arrival pulse. The original 40-point interval was padded with zeros to a 128-point interval. Then, a frequency range (0.31–6.25 MHZ) that contained most of the signal energy was chosen. This range corresponded to the 3rd through 41st harmonic of the FFT of a signal sampled at 20 MHZ over a 6.4 $\mu$s interval containing 128 points. Then, the complex signals in the 128×32 spatial aperture were zero padded symmetrically to 256×64 before each harmonic component in the 2-D aperture was focused in the image plane via the angular spectrum technique. Spatial raised cosine taper was also employed.

Since the system bandwidth was about 50%, $Q=f_0/\Delta f \approx 2$, where $f_0$ is the central frequency. For such Q, the first sidelobes (due to finite aperture size) in both principal axes remain and are reduced to about −30 dB level by employing the raised cosine taper.

In the experimental configuration, two basic phase deaberration algorithms, time-delay compensation (TDC) and phase conjugation (PC), and two wavefront compensation algorithms, wideband DSA and BPT, were applied to each measured 2-D wavefront set and their effects upon focusing were compared. A square root compression and a fourth root compression of the wavefront amplitude in addition to PC and a square root compression of the wavefront amplitude in addition to BPT were also implemented and their effects upon focusing were compared with the four deaberration algorithms, TDC, PC, DSA, and BPT, taken alone.

For TDC, an arrival time fluctuation profile at the aperture was calculated in three steps. In step 1, a reference waveform with good signal-to-noise ratio was selected from geometrically corrected waveforms. The selected waveform was continuously modified to reduce the effect of the arbitrariness in the initial selection as waveforms in the aperture are cross-correlated with it. The modification was accomplished by time-shifting and adding a new waveform to the reference pulse if the peak value of the correlation function between the new waveform and the current reference waveform was greater than 0.8. The average total number of waveforms that were incorporated into the final reference waveform selection was 2690, which accounted for 66% (9.5%) of the total pulses. The average was calculated upon a total of 16 in vitro samples using a selection procedure similar to the one developed by Liu et al.

In step 2 of TDC, the arrival time fluctuation profile was calculated from cross-correlation peaks of geometrically corrected waveforms and the reference waveform when the peak values of the correlation function between the waveforms and the reference waveform was greater than 0.7. At this step, the average total number of waveforms that are incorporated into the calculation of the arrival time profile was 3518, which accounts for 86% (std. 4.2%) of the total pulses.

In step 3 of TDC, for the bad waveforms with cross-correlation peaks less than 0.7, the arrival time fluctuations at these positions were calculated as follows: (1) calculate cross-correlation peaks between each bad waveform and neighbor waveforms (within a 5 by 5 spatial window) that are incorporated in step 2; (2) select those neighbor waveforms having cross-correlation peaks, calculated in (1), greater than 0.5; and (3) calculate the average of arrival time fluctuation from arrival time differences between the bad waveform and the selected neighbor waveforms, and the arrival time fluctuations of the corresponding neighbor positions. This average was assigned to the bad waveform position. A justification for this step is that for badly distorted waveforms, they are dissimilar to the reference waveform to a large extent, but they are somewhat similar to the waveforms in the closest neighborhood which are reasonably correlated with the reference waveform. After this step, the average total number of pulses that are incorporated into the calculation of the arrival time profile was 3966, which accounts for 97% (std. 1%) of the total pulses. For the waveforms that have not been incorporated into the calculation of the arrival time profile after step 3, arrival time fluctuations at these positions are assigned to zero. The calculated average arrival time fluctuation of 16 entire profiles was 37.6 ns with a 10.5 ns standard deviation.

Except for TDC, the following correction procedures are preferably implemented upon the complex wavefront at each frequency after Fourier decomposition. The image formation procedures after using each correction method were the same as the procedures described above.

For PC, let $A_f(x,y)\exp(j\phi_f(x,y))$ represent the complex signal at each frequency after Fourier decomposition, where $A_f$ and $\phi_f$ are functions of positions (x,y) in the 2-D array at frequency f. The complex weight vector of phase conjugation is $w_f=\exp(-j\phi_f)$ and the signal after weighting is $A_f$. The image formation after phase conjugation is the same as described above. Phase conjugation at each frequency within the signal band (without amplitude weight) provides perfect phase compensation except for a $2\pi$ phase jump. The result is better than TDC because of the removal of residual phase error. The wavefront amplitude distortion remains, however. It is desired to evaluate the limit of phase compensation and the extent of the wavefront amplitude distortion effect.

When wideband DSA is used, the complex weight vector of DSA at each frequency is $w_f=A_f\exp(-j\phi_f)$ and the signal after weighting is $A_f^2$. Wideband DSA is an approximation of the TRM receive mode developed by Dorme et al. in an article entitled "Focusing in Transmit-Receive Mode Through Inhomogeneous Media: The Time Reversal Matched Filter Approach," *J. Acoust. Soc. Am.*, Vol. 98, pages 1155–1162 (1995). The difference between wideband DSA and TRM receive mode is the scanning procedure. At a target position A, wideband DSA and TRM receive mode produce exactly the same responses, because of the reciprocity principle. However, at a non-target position B, wideband DSA uses linear geometry between A and B to scan the beam while the TRM receive mode could back-propagate the wave to the aberrator position, and then use linear geometry to scan the beam. For points that are within the correlation distance of A, wideband DSA and the TRM receive mode should produce similar responses. The correlation distance of the breast has been found to be about 4–5 mm. Therefore, within a 4–5 mm radius, similar performances between wideband DSA and TRM receive mode is expected. Wideband DSA was used in the experimental setup to evaluate the possible improvement of deaberration due to the additional SNR gain provided by amplitude weighting.

BPT is implemented by backpropagating the complex wavefront at each frequency after Fourier decomposition to the optimal distance and then using phase conjugation at that distance. The use of phase conjugation instead of TDC at the backpropagation distance reduces the complexity in the calculation. The backpropagation distances are taken from the afore-mentioned Hinkelman article.

To determine the extent of the contrast improvement when using PC and BPT with and without the amplitude compression technique of the invention, the amplitude compression at step 32 was implemented as follows:

PC with square root compression: The weight vector at each frequency is $w_f=A_f^{-1/2}\exp(-j\phi_f)$ and the signal after weighting is $A_f^{1/2}$.

PC with fourth root compression: The weight vector at each frequency is $w_f=A_f^{-3/4}\exp(-j\phi_f)$ and the signal after weighting is $A_f^{1/4}$.

BPT with square root compression: BPT with square root compression was implemented the same as PC with square root compression but the procedure was done at the optimal back propagation distance after backpropagating each complex wavefront to the optimal distance.

Figure 6A:
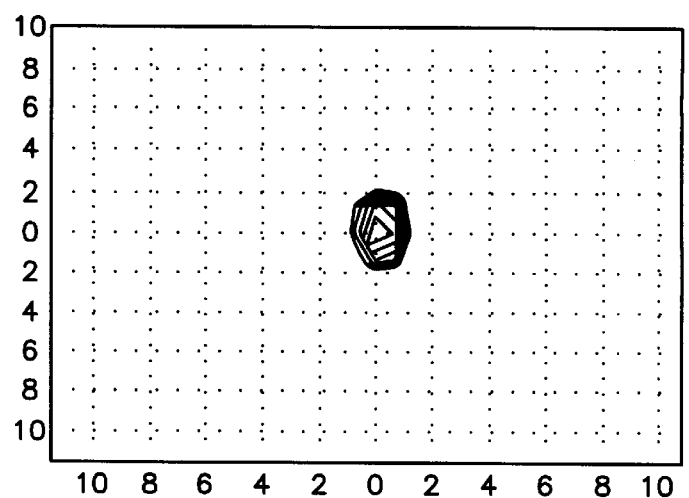
FIG. 6(a) illustrates water data showing the diffraction pattern of the system used in the invention, where the outer contour is at the −10 dB level.
Figure 6B:
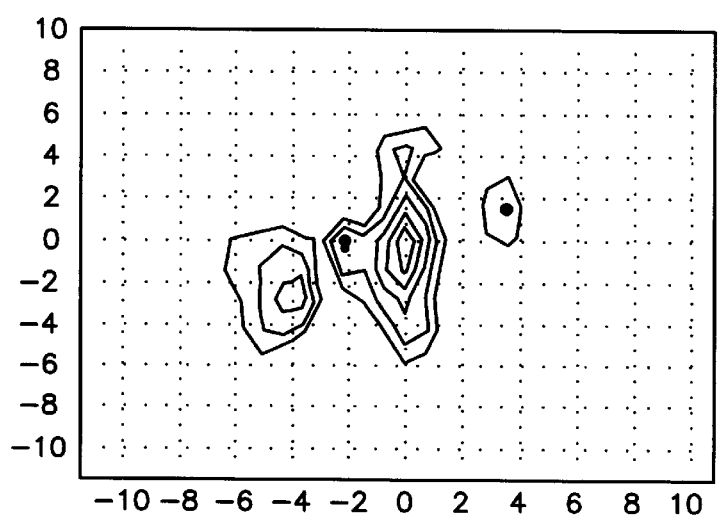
FIG. 6(b) illustrates measurements through 4-cm breast tissue, showing that three lobes instead of one central image lobe appear, thus illustrating broadening of the image lobe and a highly asymmetric interference pattern.
Figure 6C:
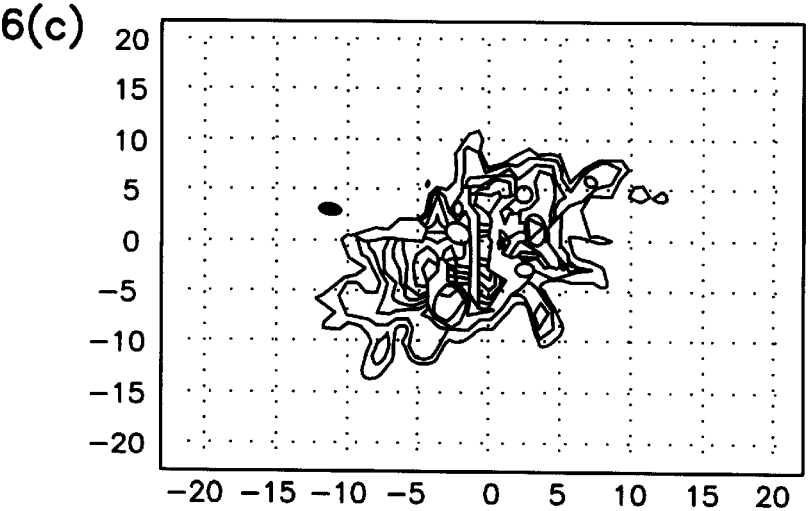
FIG. 6(c) illustrates that a symmetric scattering pattern generally appears in the ultrasound image when the threshold is reduced.

Breast images were then taken using the techniques of the invention. As known by those skilled in the art, in most breast samples scattering and coherent interference are both present. FIGS. 6(a)–(c) are −10 dB 2-D contour plots of point source images obtained from a water path (FIG. 6(a)) and 4-cm breast tissue path (FIGS. 6(b)–(c)), where the contour spacing is 2 dB. Abscissa and ordinate are azimuth and elevation in mm in the image plane. FIG. 6(a) illustrates water data showing the diffraction pattern of the system, where the outer contour is at the −10 dB level. In FIG. 6(a), because the size of the receiving array 14 in elevation is half the size in the array direction, the width of the image in elevation is twice as large as in azimuth. In the image of FIG. 6(b) measured through the 4-cm tissue, three lobes instead of one central image lobe appear, thus illustrating broadening of the image lobe and a highly asymmetric interference pattern. Once again the outer contour is the −10 dB level. As shown, inner contours of the image lobe are close to the system diffraction pattern of FIG. 6(a), while the outer contours are highly irregular due to scattering. Point resolution is worsened in azimuth by approximately 2:1 and in elevation by approximately 3:1. Two refractive lobes with strengths −6 dB and −8 dB appear at (−4, −2.5) and (3.5, 1.5). A symmetric scattering pattern generally appears when the threshold is reduced, as shown in FIG. 6(c) with a −16 dB threshold contour and contour spacings of approximately 1.5 dB. The outer contours show a roughly symmetric pattern typical of scattering while the inner contours show an asymmetric lobular interference pattern. The energy is spread over a large area.

FIGS. 7(a)–7(i) are the distortion corrected contour maps of the sample image of FIGS. 6(a)–6(c) after applying different correction methods. In each case, the Nth root amplitude compression technique of the invention improved each method considerably. In each drawing, the contour spacings are the outer contour levels divided by 10.

Figure 7A:
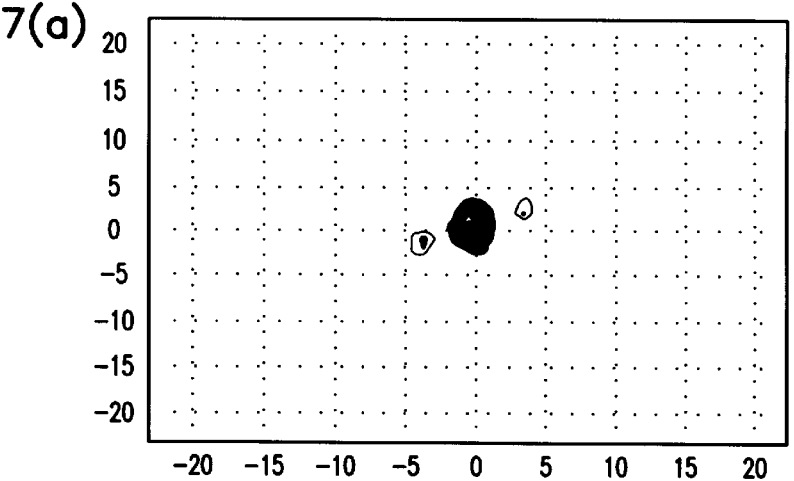
FIGS. 7(a)–7(i) are the distortion corrected contour maps of the sample image of FIGS. 6(a)–6(c) after applying several different aberration correction methods.

FIG. 7(a) is the −16 dB contour map after applying TDC (see FIG. 6(c) for comparison). As illustrated, image quality improved significantly because of the minimization of the phasefront distortion caused by scattering. The area within the −16 dB inner contour is reduced by a factor of 11. The mainlobe pattern is close to the system diffraction pattern although the area is still 1.6 times larger than the area in water at the same level. Two large lobes remain as expected and appear as two additional sources.

Figure 7B:
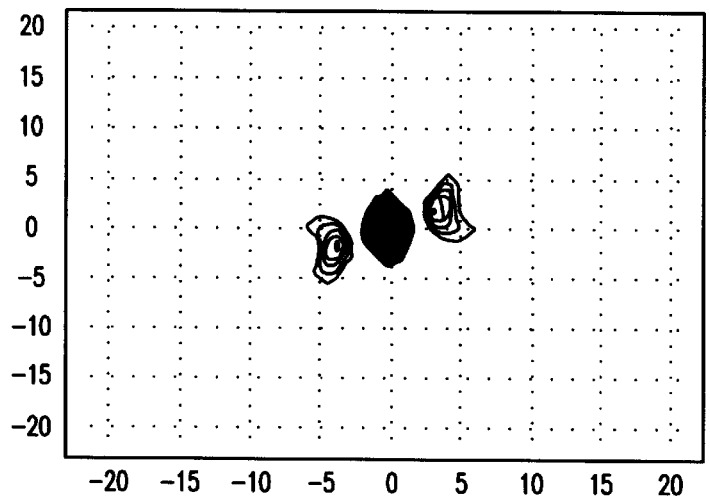

FIG. 7(b) is the correction result at a −16 dB level after applying wideband DSA. It is evident that the procedure enhances interference in this example; the artifacts are 5 dB higher than the time-delayed correction in FIG. 7(a).

Figure 7C:
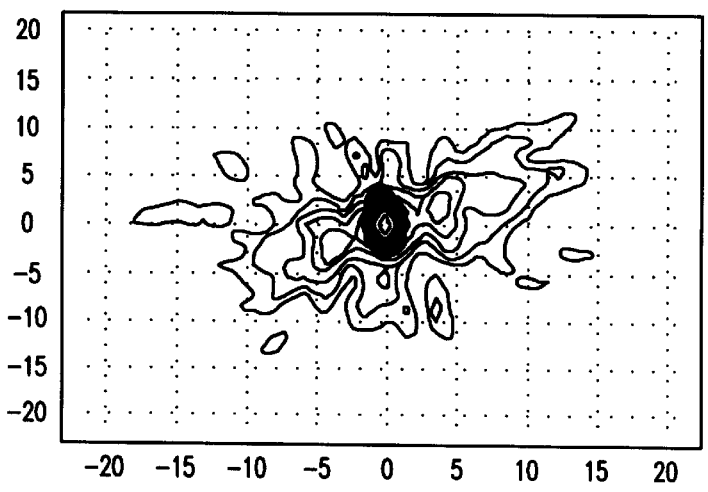

FIG. 7(c) shows the −30 dB contour plot of TDC. As illustrated, the inner contours show an asymmetric interference pattern with scattered energy distributed around the two interference lobes while the outer contours show the more symmetric scattering pattern caused by incoherent wavefront amplitude distortion and residual phase distortion.

Figure 7D:
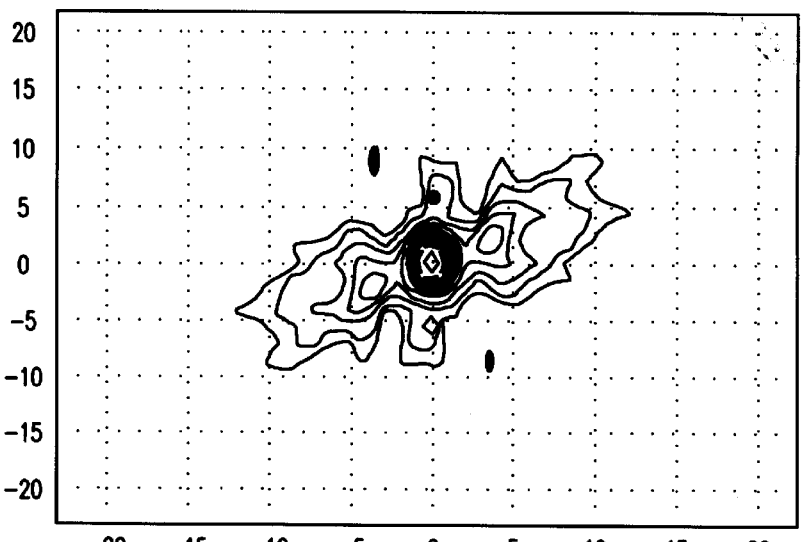

FIG. 7(d) is the correction result after applying PC at −30 dB. The approximately symmetric scattering pattern outlined by outer contours in FIG. 7(c) is improved due to better phase deaberration. The energy is more concentrated around the image lobe and interference lobes.

Figure 7E:
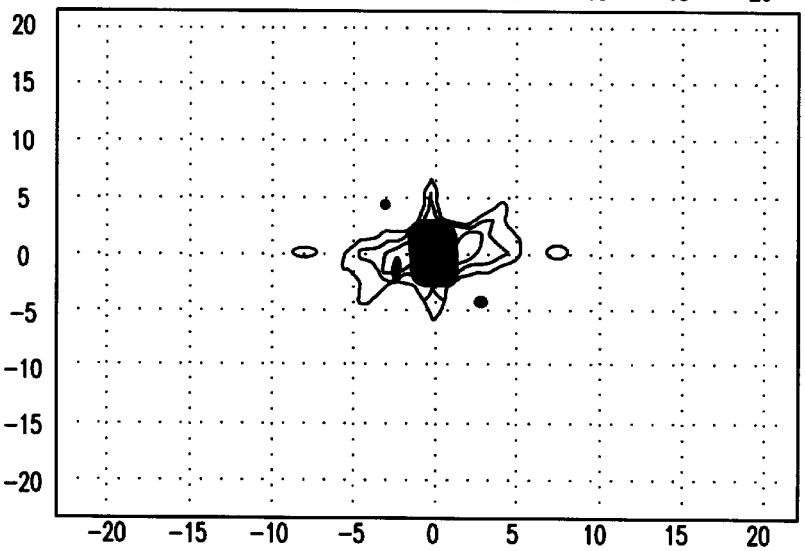

FIG. 7(e) is the correction result after applying backpropagation and PC at the optimum backpropagation distance. The scattering pattern is further improved as compared with the correction result of PC at the aperture. The backpropagation distance of the illustrated sample is 50 mm.

Figure 7F:
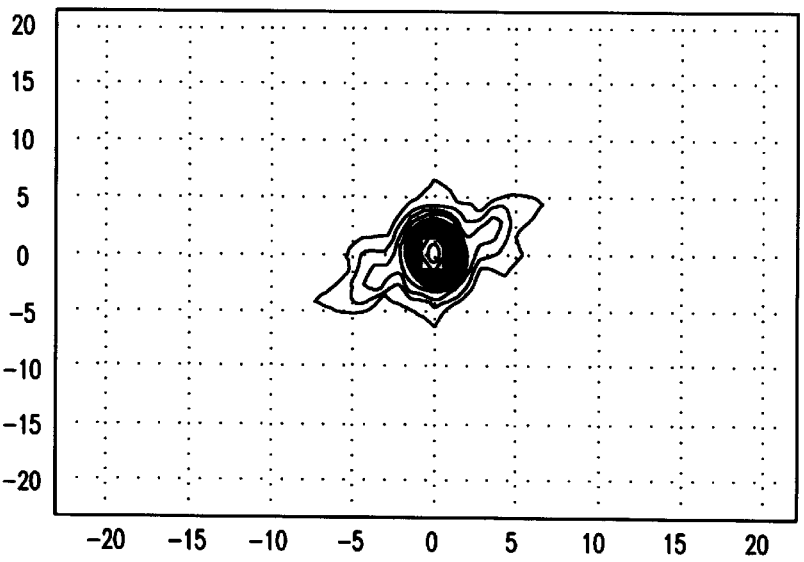
Figure 7G:
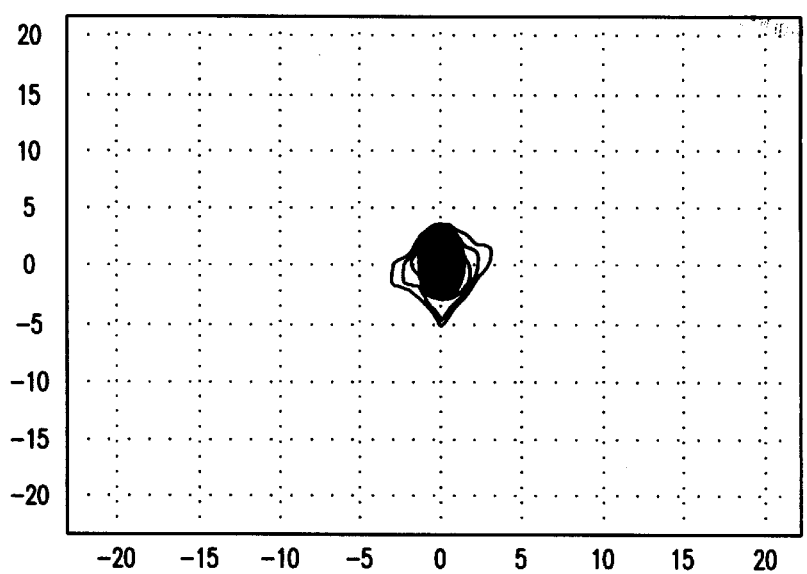
Figure 7H:
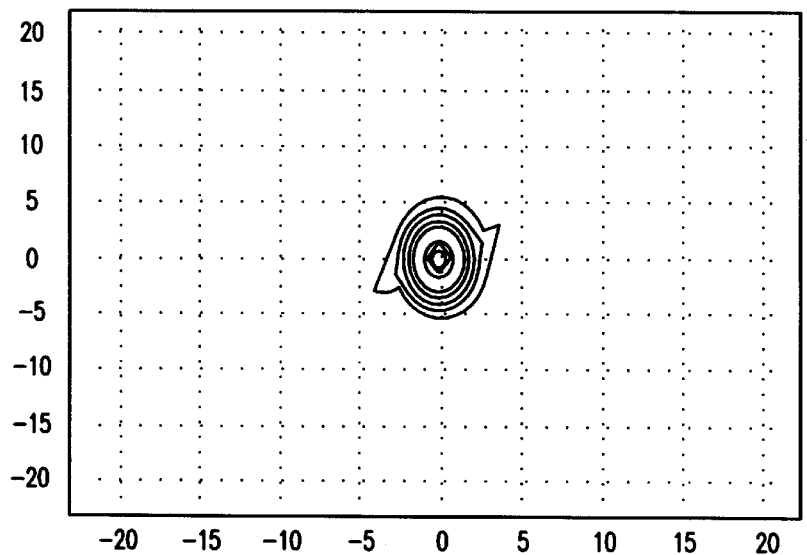

FIGS. 7(f)–7(h) are the correction results upon using the wavefront compression technique of the invention.

FIG. 7(f) is the result upon using PC and a square root amplitude compression algorithm in accordance with the invention at −30 dB. As illustrated, the pattern is very close to the system diffraction pattern.

FIG. 7(g) illustrates the correction results upon using a Backpropagation-PC and square root amplitude compression algorithm in accordance with the invention at −30 dB.

FIG. 7(h) illustrates the correction results upon using PC and a 4th order root amplitude compression algorithm at −30 dB. As illustrated, the diffraction-limited image is restored in accordance with the invention to a −30 dB level.

Figure 7I:
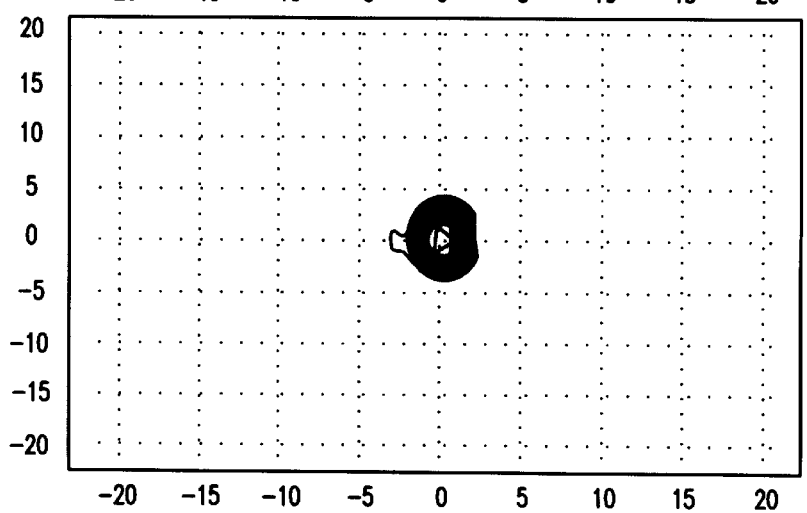

FIG. 7(i) illustrates a water contour at −30 dB for comparison with FIGS. 7(f)–7(h).

As illustrated in FIG. 7, the strengths of the two interference lobes are also reduced by 8 dB after TDC and PC. They are further reduced by 5, 7, 11 and 15 dB after backpropagation and PC, PC and square root amplitude compression, backpropagation-PC and square root amplitude compression, and PC and 4th order root amplitude compression, respectively. The improvement comes from the scattered energy which is originally distributed around the mainlobe and each of the refracted multipath lobes. This energy is coherently added back, by the deaberration process, to the dominant lobe, which in this case is the mainlobe. The overall result is an improvement of the image lobe to the interference lobe ratio.

STATISTICS OF CONTRAST IMPROVEMENT

A simple model has been developed which relates measurable parameters (wavefront amplitude variance and arrival time variance) to image contrast loss through a measurable quantity, namely, energy ratio (ER). ER is defined as the ratio of energy outside the mainlobe to energy inside the mainlobe. The model predicts that 1) ER grows with propagation depth, and 2) each square root operation upon wavefront amplitude in accordance with the invention reduces ER by a factor of 4 and therefore improves image contrast by 6 dB when the wavefront phase error is completely corrected. Surprisingly, these results agree reasonably well with in vitro experiments.

MODEL

Figure 8A:
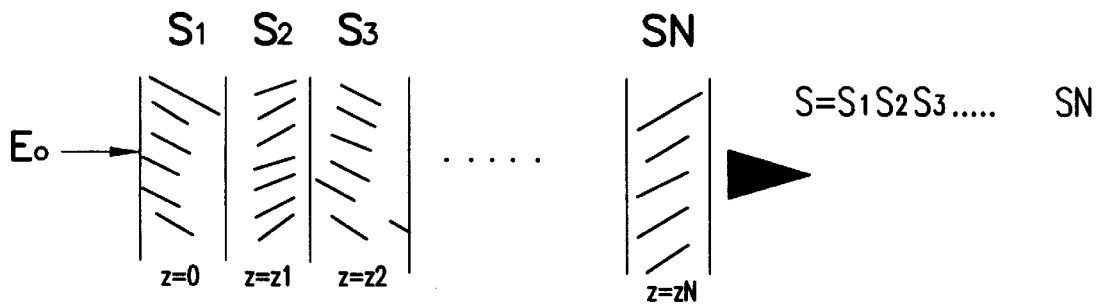
FIGS. 8(a) and 8(b) together illustrate that the ultrasonic field can be modeled as the product of contributions from each layer, where the wavefront amplitude fluctuation increases as the ultrasonic wave propagates.
Figure 8B:
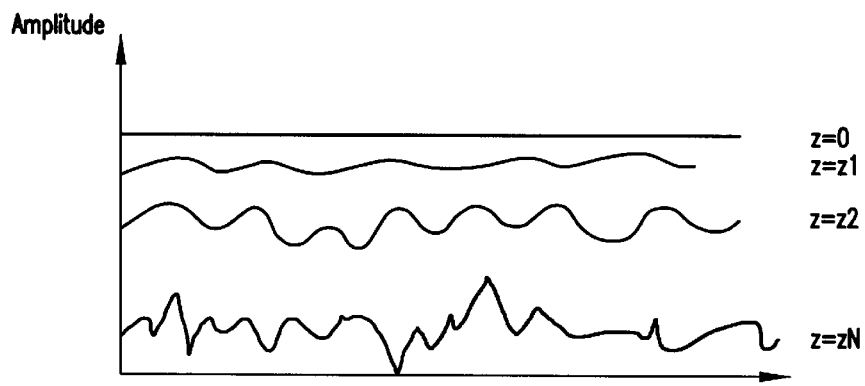

In the case of distributed scattering, the coherent component is attenuated and the incoherent component is scattered broadly. Wavefront amplitude is distorted in addition to phasefront distortion. A more suitable representation of the field is the Rytov model. A distributed random distortion medium can be represented as a cascade of thin, independent distortion layers, as shown in FIG. 8(a), or a phase screen. At the ith layer, the field can be written as $S_i = A_i \exp(j\Psi_i)$. Phasefront distortion is developed due to time shift through each layer. Wavefront amplitude distortion is developed as the phase-aberrated wavefront propagates through the medium to successive layers (FIG. 8(b)).

Let $S_0 = A_0 \exp(j\Psi_0)$ be the reference field. The distorted field is then a product of contributions from each layer:

$$S(x) = S_0 S_1 S_2 \ldots S_i \ldots S_N$$

The amplitude of $S(x)/S_0(x)$ denoted as a is $a = A_1 A_2 \ldots A_i \ldots A_N$, and the phase $\phi = \Psi_1 + \Psi_2 + \ldots \Psi_i \ldots + \Psi_N$. Assuming that the layers are statistically independent and have common statistics, then $A_i = \bar{A} + \delta A_i$ and $$a = (\overline{A})^N \sum_{i=1}^{N} \left(1 + \frac{\delta A_i}{\overline{A}}\right) = \quad \text{Equation (1)}$$

$$(\overline{A})^N \left(1 + \sum_{i=1}^{N} \frac{\delta A_i}{\overline{A}} + \text{higher order products}\right)$$

Since $\overline{A}$ is close to unity and $\delta A_i/\overline{A}$, i=1,2, ... N, are independent variables, the amplitude variance of a normalized to $(\overline{A})^N$ is $\sigma^2_a \approx N\sigma^2_{\delta A/\overline{A}}$, where $\sigma^2_{\delta A/\overline{A}}$ is the normalized amplitude variance of a single screen. $\sigma^2_a$ grows linearly with the total number of phase screens N and therefore with the propagation distance D. The phase variance $\sigma^2_\phi = N\sigma^2_\psi$, where $\sigma^2_\psi$ is the variance of a single phase screen. Therefore, $\sigma^2_\phi$ grows linearly with N and D. The overall spectrum (sum of coherent and incoherent spectra) is broadened and reduced in strength. The background level is increased and therefore image contrast is reduced.

Since the scattered energy increases with the propagation depth, the energy ratio (ER) is a useful tool to quantitatively evaluate the depth-dependence distortion upon image contrast. The relationship between ER and propagation depth D is $$ER = C(\sigma^2_{\phi_t} + \sigma^2_{A_t}) = CN\left(\sigma^2_\phi + \sigma^2_{\frac{\delta A}{\overline{A}}}\right) = C\frac{D}{d}\left(\sigma^2_\phi + \sigma^2_{\frac{\delta A}{\overline{A}}}\right) \quad \text{Equation (2)}$$

where C is a function of the source illumination profile and d is the thickness of the screen and is approximately the correlation distance of the medium. ER linearly grows with the propagation distance. This relationship is analogous to the average sidelobe floor in the radiation pattern of an array with errors and to the average sidelobe floor in an arbitrary source distribution imaged through a distorting medium. Equation (2) can be applied to wideband as an approximation.

Square root amplitude weighting in accordance with the invention changes Equation (1) to $$a^{1/2} = (\overline{A})^{N/2} \prod_{i=1}^{N} \left(1 + \frac{\delta A_i}{\overline{A}}\right)^{1/2} = \quad \text{Equation (3)}$$

$$(\overline{A})^{N/2}\left(1 + \sum_{i=1}^{N} \frac{\delta A_i}{2\overline{A}} + \text{higher order products}\right)$$

The amplitude variance $\sigma^2_{a^{1/2}} \approx N\sigma^2_{\delta A/\overline{A}}/4$, which is 4 times less than with unit amplitude weight, assuming phase error is compensated. ER will reduce by a factor of 4 which implies about a 6 dB increase in image contrast. Nth root amplitude compression will reduce the amplitude variance by 2N if the SNR is still adequate. The detailed evaluation of the effects of this compression operation upon image can be performed by studying the amplitude distributions of images before and after the operation.

The complex weights of MF, PC and PC with the square root compression function are, respectively, a, 1 and $a^{-1/2}$, each multiplied by $\exp(-j\phi)$. The signal after weighting is $a^2$, a and $a^{1/2}$. By using first order approximation, the variance of $a^2$ is found to be about 4 times larger than $\sigma^2_a$, while the variance of $a^{1/2}$ is about 4 times smaller when a narrowband waveform is used, where $\sigma^2_a$ denotes the variance of a. These increases and decreases in amplitude variance account for the linear increase and decrease in sidelobe energy ER.

EXPERIMENTAL RESULTS

Contrast Improvement

As known by those skilled in the art, contrast is the measure used to quantitatively evaluate improvement upon image quality through the use of different correction algorithms. Image contrast is the metric of the brightness point in an image to the peak background, i.e., it defines the dynamic range window between target strength and background (noise, scatter, refractive artifacts). It is similar to sidelobe level as a measure of quality of a radiation pattern. In a point source image, the measurement can be made by direct observation of the background peak. However, in most cases the background peak occurs on the skirts of the main diffraction lobe of the target and its amplitude can not be directly discerned. Its effect is to distort the mainlobe. In these cases, contrast is measured down to the lowest level at which mainlobe diffraction shape is maintained. The mainlobe diffraction shape is identified when the elevation-image width to the horizontal width is approximately (1) a 2 to 1 ratio, and (2) the outermost image contour has an elliptical shape. The evaluation is done by visual inspection at each contour level until the criteria are met.

The average levels (standard deviation) of the restored mainlobe diffraction shape before and after corrections of the experimental data are given in Table I. The data were obtained from 16 in vitro measurements. It is interesting to note that the average levels using a square root amplitude compression approach in accordance with the invention improves the performances of PC and BPT by 5.5 dB and 5.4 dB (last row of columns 5 and 8), respectively, which are close to 6 dB. Wideband DSA is 4.7 dB worse than PC (last row of column 3), and PC with fourth root amplitude compression improves PC with square root amplitude compression by 5.8 dB (last row of column 6). These numbers are all close to 6 dB as predicted by analysis above.

TABLE I

| | Statistics of restored mainlobe diffraction shape level | | | | | | |
|---|---|---|---|---|---|---|---|
| Diffraction Pattern (dB) w/o correction | | Diffraction pattern after correction(db) | | | | | |
| | TDC | Wideband DSA | PC | PC & square rooter | PC 4th order rooter | BPT | BPT & square rooter |
| −4.5(2.2) | −19.3(2.4) | −14.8(2.3) 4.7 dB | −19.5(2.6) | −25.3(2.5) 5.5 dB | −31.1(1.7) 5.8 dB | −24.0(2.0) | −29.4(2.8) 5.4 dB |

ER Versus Propagation Depth

The model which predicts that the scattered energy increases with the propagation depth D is verified by experiments. $\sigma^2_a$ is calculated as follows: 1) calculate energy at each (x,y) position at the aperture by summing the energy over the time window; 2) calculate amplitude at each (x,y) position by taking the square root of the energy; 3) calculate the reference amplitude profile which is the fourth order polynomial fit of the measured amplitude profile; and 4) calculate normalized amplitude variance of the measured amplitude profile divided by the reference amplitude profile. $\sigma^2_\phi$ was calculated from the arrival time fluctuation profile obtained with the TDC technique, as described above.

Figure 9A:
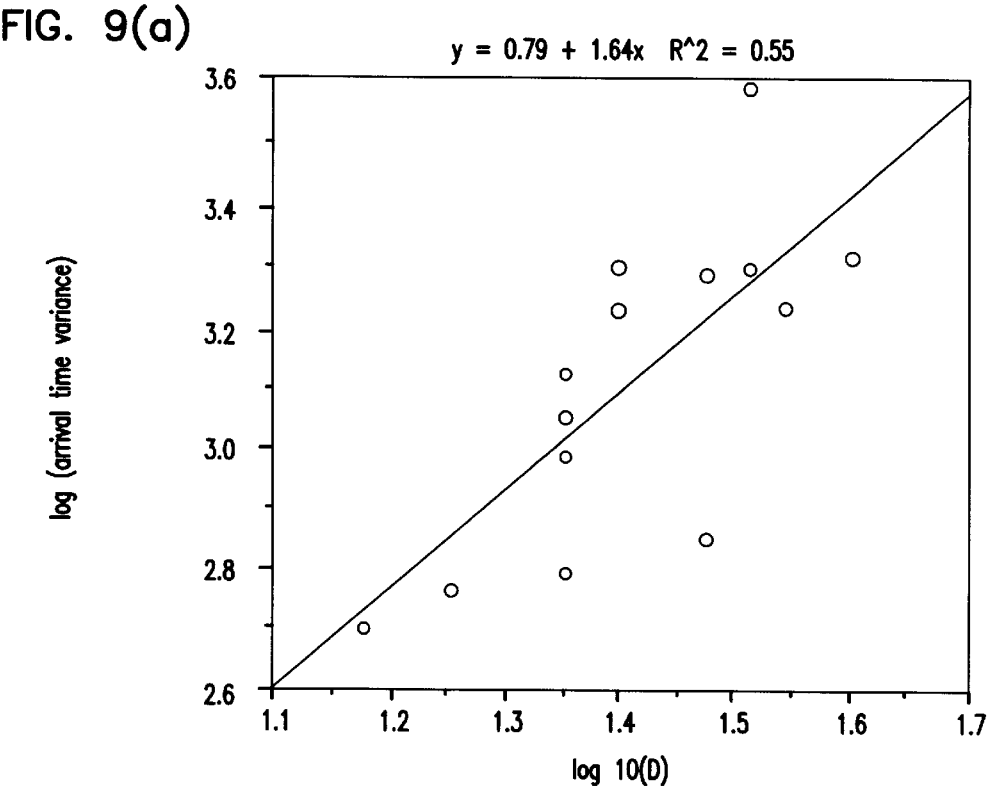
FIG. 9(a) shows the linear regression plot of $\log(\sigma^2_\phi)$ versus $\log(D)$.
Figure 9B:
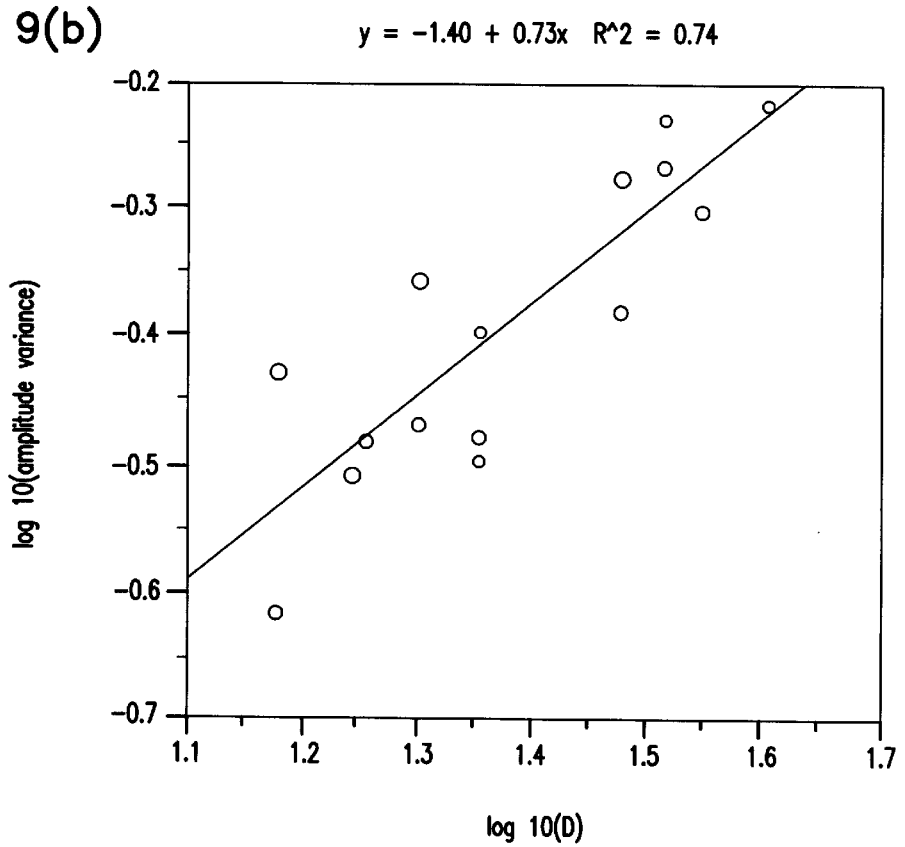
FIG. 9(b) shows the linear regression plot of $\log(\sigma^2_a)$ versus $\log(D)$.

FIG. 9(a) shows the linear regression plot of $\log(\sigma^2_\phi)$ versus $\log(D)$, and FIG. 9(b) shows the linear regression plot of $\log(\sigma^2_a)$ versus $\log(D)$, where D is in mm, the arrival time variance $\sigma^2_\phi$ is in ns², and $\sigma^2_a$ is the normalized amplitude variance. A total of 16 independent measurements with sample thickness ranging from 1 to 4 cm are included in the regression study. The correlation coefficients are 0.55 and 0.74, respectively, and the slopes are on the order of unity. In both plots, the linear relationships are statistically significant (i.e., $\alpha=0.05$ if the correlation coefficient is greater than 0.53 for sample size 14 and 0.497 for sample size 16). The low correlation coefficient in FIG. 9(a) is due to the difficulty of estimating arrival time profiles when the waveforms are highly distorted. However, the growth of $\sigma^2_\phi$ with depth D indicates that the scattered energy increases with D.

Figure 10:
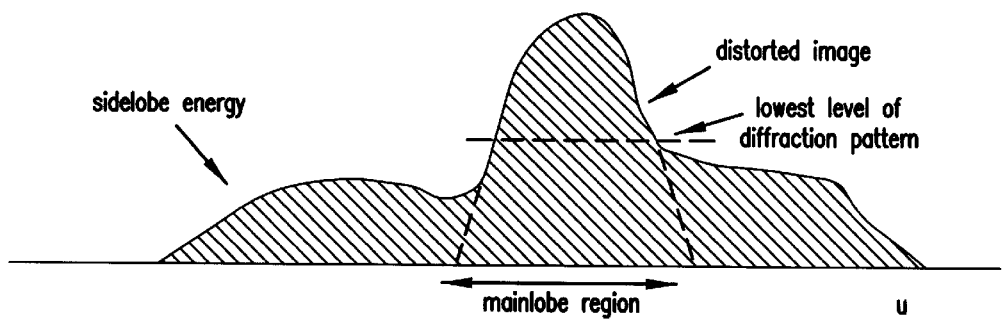
FIG. 10 illustrates the measurement procedure for measuring the energy ratio, where the mainlobe and sidelobe energies of the distorted image are obtained by integrating the energy inside and outside the mainlobe region.

A quantitative measure of scattered energy at the image plane is the energy ratio ER, which, as noted above, is directly related to image contrast and is calculated by taking the ratio of energies measured outside the mainlobe region and inside the mainlobe region. The mainlobe region is identified by linear extrapolation between the peak image value and the outer contour of the mainlobe diffraction pattern at the lowest recognizable level (see dashed lines in FIG. 10). FIG. 10 illustrates the measurement procedure, where the mainlobe and sidelobe energies of the distorted image are obtained by integrating the energy inside and outside the mainlobe region.

Figure 11A:
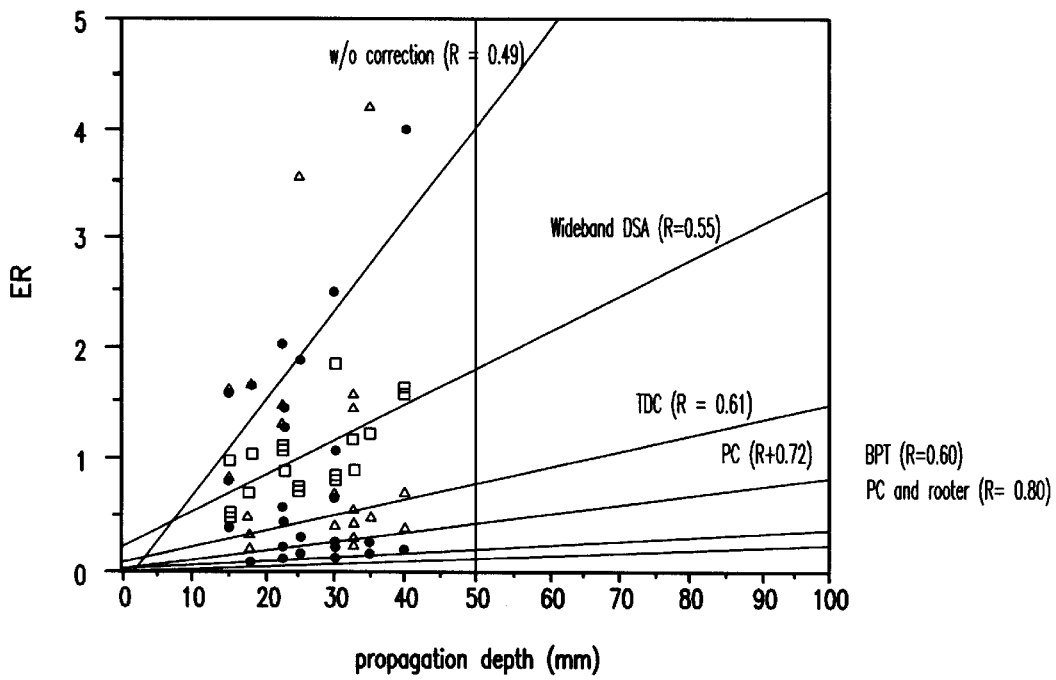
FIG. 11(a) illustrates regression curves comparing energy ratio (ER) vs. propagation depth obtained by using five different correction methods: DSA, TDC, PC, BPT, and PC with square root compression.

The upper curve of FIG. 11(a) is the linear regression plot of ER vs. D without correction. ER in water image is 0.088, which is included in the data points to represent system performance at zero depth. The correlation coefficient is 0.49 and the linear relationship is significant. The low correlation coefficient is due to the difficulty of identifying the diffraction pattern for some severely distorted images. In FIG. 11(a), all regression lines are extrapolated to 100 mm propagation depth, which is considered the maximum penetration depth of breast under soft compression. Since the data is distributed between 10 mm to 40 mm, the regions beyond 50 mm generally have a lower confidence in extrapolation.

The performances of descattering algorithms generally deteriorate with propagation depth. The rest of the regression curves in FIG. 11(a) show ER versus propagation depth obtained by using five different correction methods: Wideband DSA, TDC, PC, BPT, and PC with square root compression. ERs in water alone data provided the values at zero depth. The correlation coefficients of the regression curves are indicated in FIG. 11(a) by R. The linear relationships are statistically significant for all curves.

As is apparent from FIG. 11(a), the performance of wideband DSA is the worst among the tested correction procedures. Data sets of Wideband DSA, PC, and PC with square root compression are clearly separated with averages 103% (std. 33.9%), 25% (6.9%) and 6.8% (1.6%), respectively. The ER ratios of wideband DSA and PC, and PC and PC with square root compression are 4.1 and 3.7, respectively. These results agree very well with the factor of 4 prediction given above by analysis. At 100 mm depth, ER after PC reaches 0.85, which is in the neighborhood of the average ER with DSA correction at the average 2.7 cm propagation depth. Therefore, the best linear phase correction procedure at the aperture is likely to result in only 15 dB image contrast at this depth. The average ER after TDC is 19% more than that of PC while the averages of the lowest level at which mainlobe diffraction shape is maintained are the same when TDC and PC are used. This implies that the residual phase error due to imperfect phase correction contributes primarily to energy in the sidelobe lobe region. BPT reduces the average ER by 12.2% below that of PC and is the best among the linear operations. The performance of PC with square root compression at the aperture is slightly better than that of BPT. At 100 mm, the PC with square root compression curve reaches 0.22 which is about the average ER level of PC. The BPT curve reaches 0.38, which is about the average ER of TDC. These energy ratios are useful to provide image contrast of −20 dB.

Figure 11B:
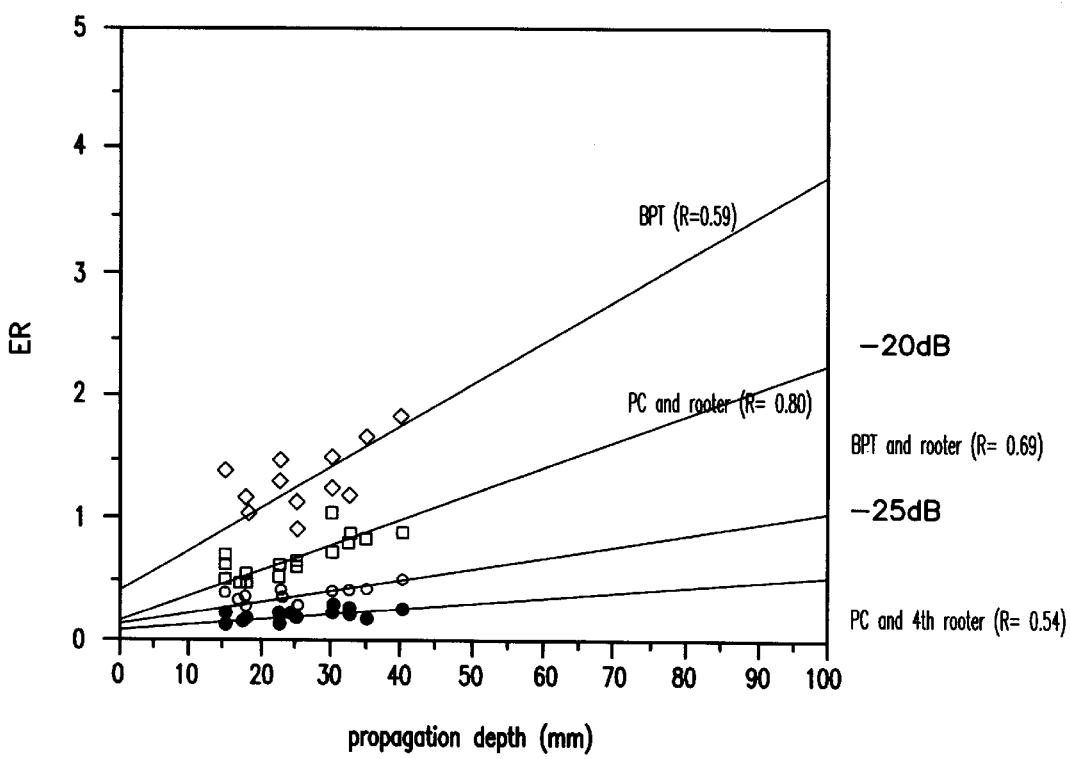
FIG. 11(b) shows the results of ER by using BPT with square root compression and PC with fourth root compression at the aperture.

FIG. 11(b) shows the results of ER by using BPT with square root compression and PC with fourth root compression at the aperture. Regression curves obtained from PC with square root compression and BPT are also included in FIG. 11(b) for comparison. At 100 mm depth, the regression curves of BPT with square root compression and PC with fourth root compression reach 0.11 and 0.05, respectively. These ERs are about the average levels of BPT and PC with square root compression obtained from the average 2.7 cm propagation depth, which indicates that focusing with image contrast of ~25 dB throughout the 100 mm propagation depth may be achievable by taking the low order root on wavefront amplitude in combination with phase deaberration at the aperture or with BPT. These results suggest that high quality focusing as far as 50–100 mm propagation depth is possible.

The wavefront deaberration correction technique of the invention is applicable to wavefront compensation on receive in pulse-echo. The received wideband waveforms are treated exactly as in one-way propagation, i.e., they are decomposed using Fourier decomposition techniques where the technique of the invention can be implemented at each discrete frequency. The technique of the invention does not require a point target in the medium. Experiments with square root amplitude compression and the time domain correction algorithm TDC have shown that ER can be reduced by 15.6% on average relative to TDC alone.

Although exemplary embodiments of the invention have been described in detail above, those skilled in the art will readily appreciate that many additional modifications are possible in the exemplary embodiment without materially departing from the novel teachings and advantages of the invention. For example, other non-linear amplitude compression functions which converge toward the inverse filtering solution may be used in place of the Nth root compression function of the invention. In addition, the system of the invention may be used in a 2-way echo scanning system as well. Accordingly, all such modifications are intended to be included within the scope of this invention as defined in the following claims.

What we claim is:

1. A method of obtaining a high contrast ultrasound image of a medium, comprising the steps of:

transmitting an ultrasound signal from an ultrasonic source to said medium;

receiving an ultrasonic wavefront signal at an imaging aperture, said ultrasonic wavefront signal being formed as said ultrasound signal traverses through said medium toward said imaging aperture;

compressing the spectrum amplitude A of the ultrasonic wavefront signal at said imaging aperture as a function of N, where the compressed spectrum amplitude converges to 1 as N approaches infinity, so as to increase image contrast while maintaining a desired signal to noise ratio; and synthesizing a wideband ultrasonic image from said spectrum amplitude compressed ultrasonic wavefront signal for display.

2. The method of claim 1, wherein said spectrum amplitude compressing step comprises the step of calculating the Nth root of the amplitude A.

3. The method of claim 2, wherein N=2.

4. The method of claim 2, wherein N=4.

5. The method of claim 1, comprising the further step of compensating for phase aberrations in said ultrasonic wavefront signal.

6. The method of claim 1, comprising the further steps of decomposing the ultrasonic wavefront signal into spatial frequency components prior to said spectrum amplitude compressing step.

7. The method of claim 6, wherein said step of decomposing the ultrasonic wavefront signal into spatial frequency components comprises the step of taking the Fast Fourier Transform of temporal ultrasonic waveforms at each (x,y) position in said imaging aperture.

8. The method of claim 6, comprising the further step of performing frequency domain phase compensation in conjunction with said spectrum amplitude compressing step.

9. The method of claim 8, wherein said spectrum amplitude compressing step performed on said spatial frequency components prior to said synthesizing step comprises the steps of forming an image at each discrete frequency within a signal band using an angular spectrum technique and taking an inverse Fourier transform of images at all discrete frequencies with said signal band.

10. An ultrasound imaging system for obtaining a high contrast ultrasound image of a medium, comprising:

an ultrasonic source which transmits an ultrasound signal to said medium;

an ultrasonic receiver which receives an ultrasonic wavefront signal at an imaging aperture, said ultrasonic wavefront signal being formed as said ultrasound signal traverses through said medium toward said imaging aperture;

an aberration correction circuit which compresses the spectrum amplitude A of the ultrasonic wavefront signal at said imaging aperture as a function of N, where the compressed spectrum amplitude converges to 1 as N approaches infinity, so as to increase image contrast while maintaining a desired signal to noise ratio; and an ultrasonic image display which displays a wideband ultrasonic image synthesized from said spectrum amplitude compressed ultrasonic wavefront signal.

11. An ultrasound imaging system as in claim 10, wherein said aberration correction circuit includes means for calculating the Nth root of the amplitude A.

12. An ultrasound imaging system as in claim 11, wherein N=2.

13. An ultrasound imaging system as in claim 11, wherein N=4.

* * * * *